No. 706,638. Patented Aug. 12, 1902.
V. W. CLOUGH.
REVERSING GEAR FOR ENGINES.
(Application filed Mar. 3, 1902.)
(No Model.)
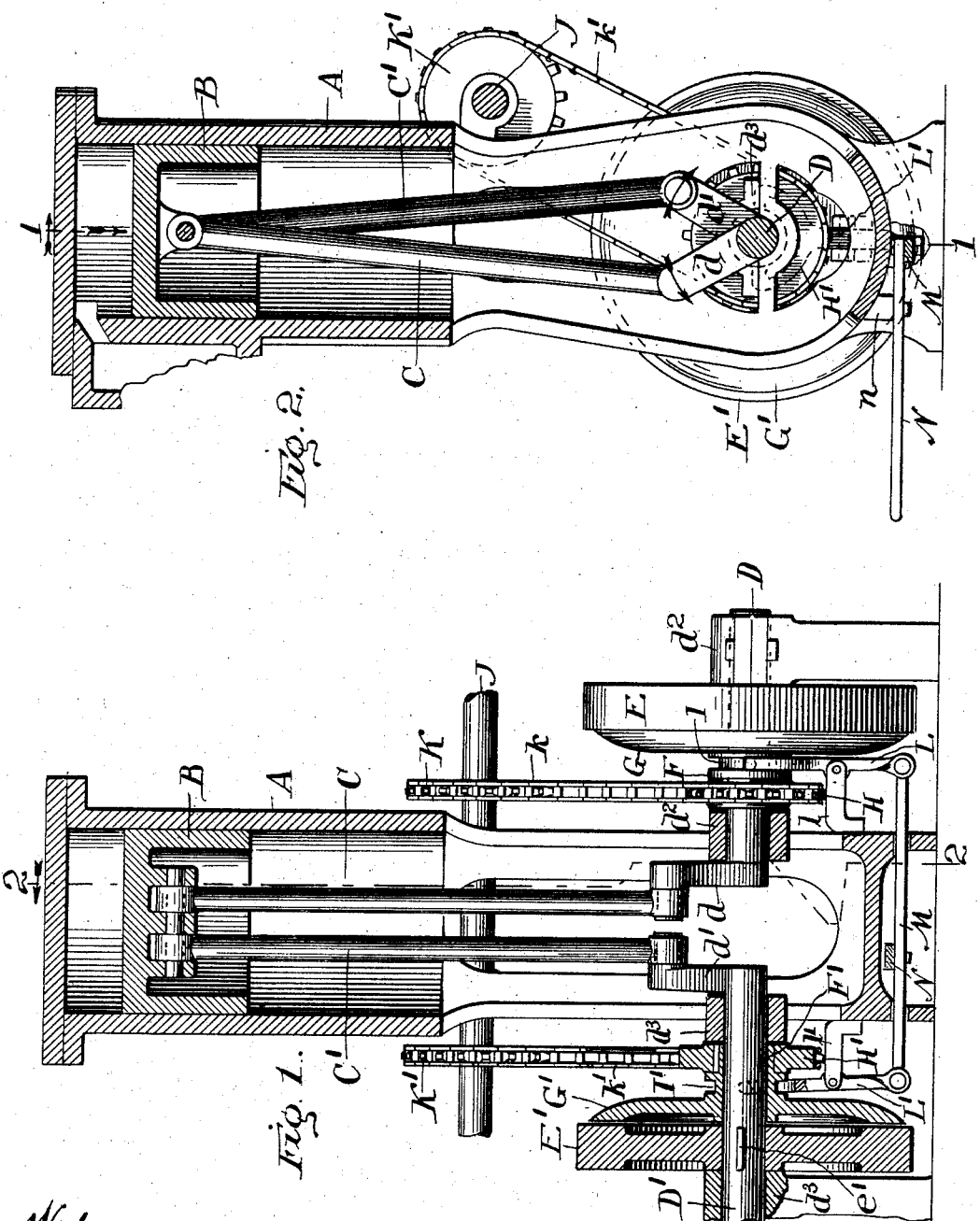
Witnesses:
Chas. O. Shurvey
S. Bliss
Inventor:
Victor W. Clough
by H. Bitner
Atty.

UNITED STATES PATENT OFFICE.

VICTOR W. CLOUGH, OF GENESEO, ILLINOIS.

REVERSING-GEAR FOR ENGINES.

SPECIFICATION forming part of Letters Patent No. 706,638, dated August 12, 1902.

Application filed March 3, 1902. Serial No. 96,518. (No model.)

*To all whom it may concern:*

Be it known that I, VICTOR W. CLOUGH, a citizen of the United States of America, residing at Geneseo, in the county of Henry and State of Illinois, have invented certain new and useful Improvements in Reversing-Gear for Engines, of which the following is a specification.

My invention relates to improvements in reversing-gear for engines; and its object is to produce a device of this class, preferably for use in connection with a single-cylinder engine, whereby the direction of rotation of the driving-shaft from which power is obtained can be quickly reversed without any injurious jarring of the driving or driven mechanism. It is particularly applicable to engines used in automobiles and light launches; but of course it can be applied to any desired class of work.

In the drawings, Figure 1 is a transverse section in the line 1 1 of Fig. 2, the right-hand portion of the drawing being in elevation; and Fig. 2 is a section in the line 2 2 of Fig. 1, the view being in the direction shown by the arrow in Fig. 1.

Referring to the drawings, A is the cylinder of an ordinary engine, either steam or gas, as may be desired.

B is a piston running in the cylinder A and having pivotally connected to it two connecting-rods C C'.

D D' are two shafts provided with cranks $d$ $d'$ and journaled in the box $d^2$ $d^2$ and $d^3$ $d^3$. The connecting-rods C C' are connected to the cranks $d$ $d'$ in the usual manner. Upon the shafts D D' are fly-wheels E E,' secured against rotation upon the shafts by keys, the one used with the fly-wheel E not being shown and the one in use with the fly-wheel E' being shown at $e'$. Upon the shafts D D' are loosely-mounted friction-clutches G G', having sleeves F F' encircling the shaft and bearing sprocket-wheels H H', the sleeves being formed with grooves I I', the uses of which will be hereinafter explained. The clutches G G' may be of any ordinary type, and they are intended to engage with the fly-wheels E E', respectively.

J is the driving-shaft of the device from which power is taken, and it is suitably journaled on the frame of the engine. Upon it are rigidly secured two sprockets K K', connected, respectively, with the sprockets H H' by chains $k$ $k'$, as is clearly shown in the drawings.

The motion of the parts when the device is in the position shown in Fig. 1 will be perfectly clear. The connecting-rods C C' rotate the shafts D D' in opposite directions, as is clearly shown by the arrows in Fig. 2. The fly-wheels E E' therefore run in opposite directions. In the position shown in Fig. 1 the clutch G is in engagement with the fly-wheel E, and the shaft therefore drives the sleeve F, the sprocket H, and hence the shaft J, in one direction. The shaft J in turn turns the sprocket K' and this the sleeve F', which runs loose upon the shaft D', its direction of rotation being naturally opposite to that of the shaft D. It is perfectly evident that if the clutch G is released from engagement with the fly-wheel E and at the same time the clutch G' is thrown into engagement with the fly-wheel E' the shaft J will then be driven from the shaft D', which runs in an opposite direction to the shaft D, and the direction of rotation of the shaft J will consequently be reversed.

In each of the grooves I I' are forks L L', which are pivotally secured to brackets $l$ $l'$ upon the frame of the machine, and these two forks L L' are connected together by the rod M, as shown. To this rod is in turn pivotally connected near its middle a lever N, also pivoted to the bracket $n$ upon the frame of the machine. It is obvious that the movement of the outer end of the lever N will move the rod M in the direction of its length and will thereby move both of the forks L L' at the same time and in the same direction. In other words, the movement of the lever N will throw both of the loose clutches in the same direction, and consequently throw one of the clutches into engagement with its fly-wheel, at the same time releasing the other clutch from similar engagement. As heretofore explained, this instantly reverses the direction of rotation of the shaft J.

The particular advantages of this reversing-gear are, first, those common to all reversing-gears wherein the friction-clutch is used—that is, the avoidance of jolts and jars upon the driven mechanism consequent upon the sudden reversing of their motion. In addition this form of gear is much more compact and simple than any device which, to my knowledge, has heretofore been used. The fact that the opposite rotation of two shafts can be secured by oppositely-directed motion of two connecting-rods running from the same piston has, as far as I am aware, never been taken advantage of in a reversing-gear, and it will be perfectly evident that this method of securing opposite rotation is greatly superior to the complicated trains of gearing heretofore in use for this purpose, both in point of lightness of construction and consequent cheapness, as well as of freedom from friction.

I realize that considerable changes can be made in the construction of this device without in any way affecting the principles involved in it, and I therefore do not intend to limit myself to the specific form herein shown.

I claim as new and desire to secure by Letters Patent—

1. In a device of the class described, the combination with two oppositely-driven shafts substantially in line with each other, a suitably-journaled driving-shaft and gear-wheels thereon, of gears loosely mounted upon each of said driven shafts, means of connection between said gears, and the gears on said driving-shaft and means for securing engagement between one of said loosely-mounted gears and its shaft and at the same time for releasing the other of said loosely-mounted gears from similar engagement; substantially as described.

2. In a device of the class described, the combination with a cylinder and a piston therein, two connecting-rods pivotally connected to said piston, two suitably-journaled shafts adapted to be driven in opposite directions by said connecting-rods, and sprockets loosely mounted upon said shafts, of a suitably-journaled driving-shaft, sprockets secured thereon, means of connection between said sprockets and said loosely-mounted sprockets on said driven shafts, and means for producing engagement between one of said loose sprockets and its shaft, and at the same time for releasing the other of said loose sprockets from similar engagement; substantially as described.

3. In a device of the class described, the combination with a cylinder, a piston therein, two connecting-rods pivotally connected to said piston, two suitably-mounted shafts adapted to be driven in opposite directions by said connecting-rods, fly-wheels on said shafts, sleeves loosely mounted on said shafts, a sprocket-wheel and a friction-clutch on each of said sleeves, and means for throwing one of said clutches into engagement with the contiguous fly-wheel, at the same time releasing the other clutch from similar engagement, of a suitably-journaled driving-shaft, sprockets thereon, and means of connection between said sprockets and the aforesaid sprockets mounted on said sleeves; substantially as described.

4. In a device of the class described, the combination with a cylinder, A, a piston, B, therein, connecting-rods, C, C', connected to said piston, shafts, D, D', adapted to be driven in opposite directions by said connecting-rods, fly-wheels, E, E', secured upon said shafts, sleeves, F, F', upon said shafts, clutches, G, G', sprockets, H, H', and grooves, I, I', upon said sleeves, forks, L, L', engaging said grooves and means whereby both of said forks can be simultaneously shifted in the same direction, of a suitably-journaled driving-shaft, J, sprockets, K, K', upon said shaft, and chains, k, k', connecting said sprockets with the sprockets, H, H'; substantially as described.

In witness whereof I have hereunto set my hand, at Geneseo, in the county of Henry and State of Illinois, this 17th day of February, A. D. 1902.

VICTOR W. CLOUGH.

Witnesses:
HARRY E. BROWN,
C. C. MARTIN.